(12) United States Patent
Yamashita

(10) Patent No.: US 8,773,611 B2
(45) Date of Patent: Jul. 8, 2014

(54) ANGLED BACKLIGHT DEVICE AND LIQUID CRYSTAL DISPLAY APPARATUS

(75) Inventor: Hiroshi Yamashita, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 420 days.

(21) Appl. No.: 12/436,411

(22) Filed: May 6, 2009

(65) Prior Publication Data

US 2009/0279019 A1 Nov. 12, 2009

(30) Foreign Application Priority Data

May 9, 2008 (JP) .................................. 2008-122874

(51) Int. Cl.
*G02F 1/1335* (2006.01)

(52) U.S. Cl.
USPC ........................................... 349/61; 362/97.3

(58) Field of Classification Search
USPC .................... 349/64; 362/97.2, 97.1, 97.3
See application file for complete search history.

(56) References Cited

U.S. PATENT DOCUMENTS

| | | | |
|---|---|---|---|
| 2002/0141066 A1* | 10/2002 | Nakamura et al. | 359/618 |
| 2003/0147257 A1* | 8/2003 | Lee | 362/561 |
| 2004/0256977 A1 | 12/2004 | Aston | |
| 2006/0203465 A1* | 9/2006 | Chang et al. | 362/29 |
| 2006/0268567 A1* | 11/2006 | Jang et al. | 362/555 |
| 2007/0146569 A1* | 6/2007 | Nouchi et al. | 349/58 |
| 2007/0230158 A1* | 10/2007 | Kitayama et al. | 362/84 |
| 2007/0246714 A1* | 10/2007 | Koike et al. | 257/79 |
| 2008/0007950 A1* | 1/2008 | Kitamura et al. | 362/250 |
| 2008/0094845 A1* | 4/2008 | Kusano et al. | 362/339 |

FOREIGN PATENT DOCUMENTS

| | | |
|---|---|---|
| JP | 2002-270019 A | 9/2002 |
| JP | 2004-109205 A | 4/2004 |
| JP | 2006147549 A * | 6/2006 |
| JP | 2007273309 A * | 10/2007 |
| WO | WO 2005/045947 A2 | 5/2005 |
| WO | WO 2007/083408 A1 | 7/2007 |

OTHER PUBLICATIONS

Extended European Search Report dated Sep. 2, 2011 (seven (7) pages).

* cited by examiner

*Primary Examiner* — Mark Robinson
*Assistant Examiner* — Andrew Jordan
(74) *Attorney, Agent, or Firm* — Crowell & Moring LLP

(57) ABSTRACT

Disclosed is a backlight device comprising: a light emitting section including a plurality of surface light emitters which are arranged and disposed so as to have a predetermined gap; and a diffuser plate which is disposed in front of the light emitting section to diffuse a light irradiated from the light emitting section, wherein an angle between two light irradiation surfaces in the adjacent surface light emitters is smaller than 180 degrees.

10 Claims, 6 Drawing Sheets

ANGLED BACKLIGHT DEVICE AND LIQUID CRYSTAL DISPLAY APPARATUS

BACKGROUND OF THE INVENTION

1. Field of the Invention

The present invention relates to a backlight device and a liquid crystal display apparatus.

2. Description of Related Art

Conventionally, a liquid crystal display apparatus comprising a liquid crystal panel, and a backlight device to irradiate a light to the liquid crystal display apparatus, wherein the light emitted from the backlight device is selectively transmitted in the liquid crystal panel so that an image is formed by the transmitted light, is known (see for example, Japanese Patent Application Laid-open Publication Nos. 2002-270019 and 2004-109205).

As the light source of the backlight device in the liquid crystal display apparatus, light sources using a line light source such as a cold cathode fluorescent lamp (CCFL) or a point light source such as a light emitting diode (LED) have been a mainstream. However, in recent years, developments for a liquid crystal display apparatus using a surface light emitter which is typified by an organic electroluminescence (hereinbelow referred to as an organic EL), and the like, as a light source to realize the thinning and the weight saving, have been in progress.

In the liquid crystal display apparatus using the surface light emitter, generally, a plurality of surface light emitters are arranged and disposed in a state of each having a predetermined gap in between so as to form a light emitting section, and a liquid crystal panel is disposed in front of the light emitting section.

However, in the above mentioned liquid crystal display apparatus using the surface light emitters, there has been a problem in that a dark section is generated in the gaps of the adjacent surface light emitters, which results in a generation of luminance unevenness in the liquid crystal panel.

SUMMARY OF THE INVENTION

The objects of the present invention include preventing the luminance unevenness in a backlight device using a surface light emitter, and providing a liquid crystal display apparatus comprising the backlight device.

According to an aspect of the present invention, there is provided a backlight device comprising:

a light emitting section including a plurality of surface light emitters which are arranged and disposed so as to have a predetermined gap; and a diffuser plate which is disposed in front of the light emitting section to diffuse a light irradiated from the light emitting section, wherein an angle between two light irradiation surfaces in the adjacent surface light emitters is smaller than 180 degrees.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENTS

Embodiment 1

In the following, an embodiment 1 of the present invention is described with reference to the drawings. However, the scope of the invention is not limited to the illustrated examples.

Figure 1:
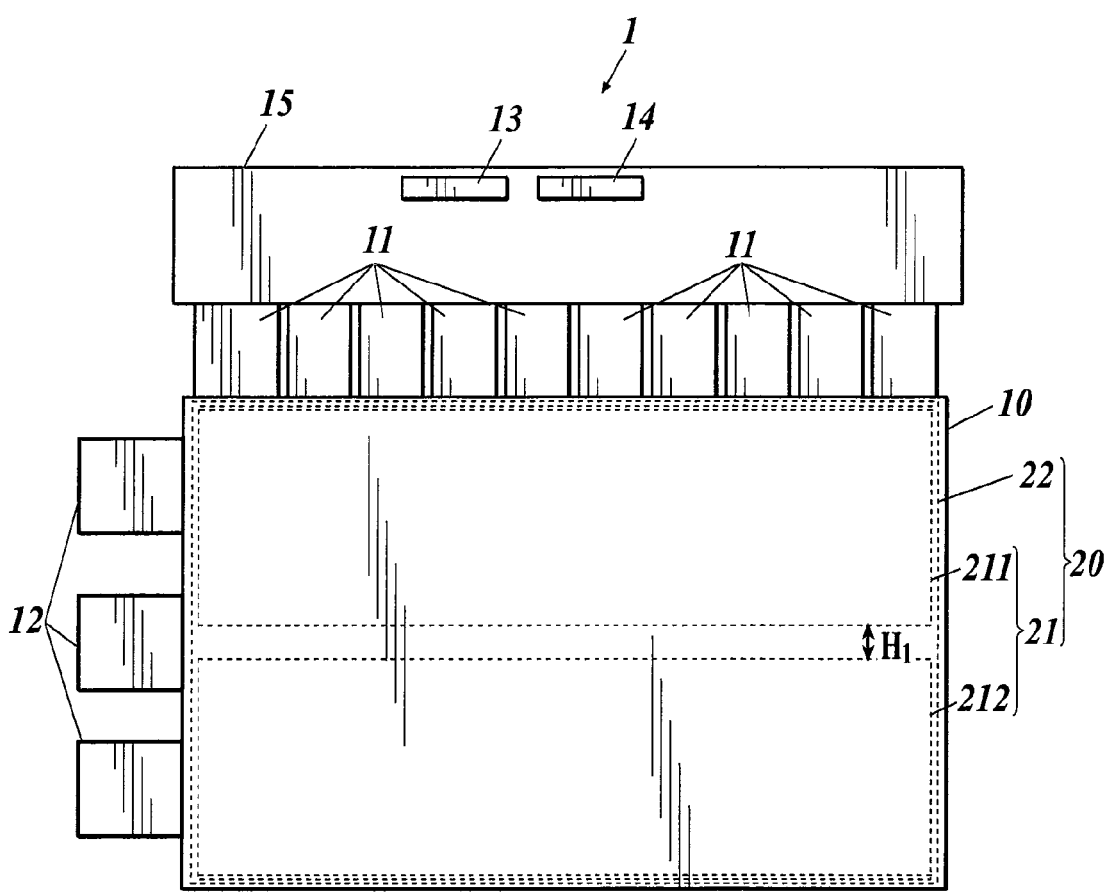
FIG. 1 is a configuration diagram showing the whole configuration of a liquid crystal display apparatus of embodiment 1 according to the present invention.
Figure 2:
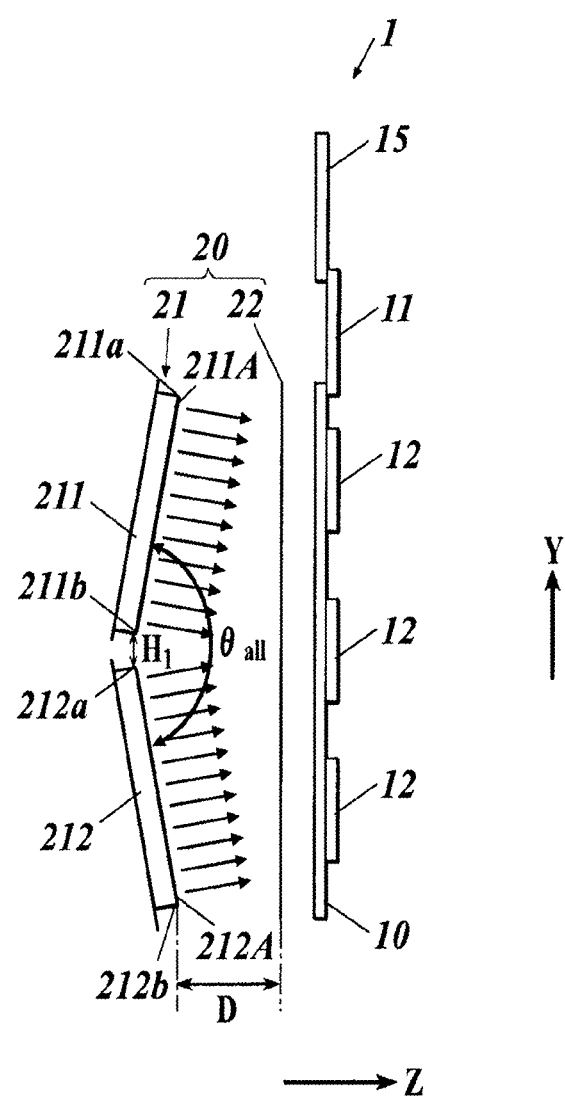
FIG. 2 is a side view of the liquid crystal display apparatus shown in FIG. 1.

FIG. 1 is a diagram showing the whole configuration of a liquid crystal display apparatus 1 according to the present embodiment, and FIG. 2 is a side view of the liquid crystal display apparatus 1 shown in FIG. 1.

The liquid crystal display apparatus 1 comprises a liquid crystal panel 10, and a backlight device 20 which is disposed in the rear of the liquid crystal panel 10.

In the following, a width direction of the liquid crystal panel 10, a height direction thereof, and a depth direction thereof are referred respectively to as X direction, Y direction, and Z direction.

The liquid crystal panel 10 is a known liquid crystal display panel which is applied to various types of liquid crystal displays (LCDs). For example, the liquid crystal panel 10 is exemplified by a display panel which comprises a liquid crystal layer formed by filling liquid crystal in between two glass substrates, and further comprises a polarizing plate which is disposed at an opposite surface of the liquid crystal layer of the both glass substrates.

Further, the liquid crystal panel 10 may be displayed in colors or in black-and-white, and is not particularly limited with regard to the type of liquid crystal, a liquid crystal cell, a driving section (a switching element) such as a thin film transistor (TFT), a black matrix (BM), and the like. Further, with respect to operation modes, any type of operation modes, such as a twisted nematic (TN) mode, a super twisted nematic (STN) mode, an electrically controlled birefringence (ECB) mode, an in-plane switching (IPS) mode, a multidomain vertical alignment (MVA) mode, and the like, is applicable.

The liquid crystal panel 10 further comprises a plurality of source drivers 11 to drive a source wire (a signal line) of the liquid crystal panel 10, and a plurality of gate drivers 12 to drive a gate wire (a scan line) of the liquid crystal panel 10. Further, a substrate 15 is connected to the liquid crystal panel 10, wherein the substrate 15 comprises a timing controller 13 to supply various timing signals to the source drivers 11 and to the gate drivers 12, and to receive display data from an external section so as to supply the received display data to the source drivers 11, and a power supply circuit 14 to generate operating voltage of each circuit and driving voltage of the liquid crystal cell.

Each of the source drivers 11 drives a plurality of source wires of the liquid crystal panel 10, and by being provided with a plurality of source drivers 11, all of the source wires of the liquid crystal panel 10 can be driven. Further, in the same manner as the source drivers 11, each of the gate drivers 12 drives a plurality of gate wires of the liquid crystal panel 10, and by being provided with a plurality of gate drivers 12, all of the gate wires of the liquid crystal panel 10 can be driven.

Further, driving voltage for one horizontal line is respectively output to all of the source wires at every one horizontal period by the plurality of source drivers 11, and one gate wire is sequentially driven at every one horizontal period by the plurality of gate drivers 12. Thereby, a liquid crystal cell for one horizontal line in which the source wire and the gate wire intersects, is sequentially driven so as to perform a display operation.

The backlight device 20 comprises a light emitting section 21 to irradiate a light to the liquid crystal panel 10, and a diffuser plate 22 which is disposed in front of the light emitting section 21 (a liquid crystal panel 10 side) so as to diffuse the light irradiated by the light emitting section 21.

The light emitting section 21 according to the present embodiment is configured in a state where two surface light emitters 211, 212 are arranged and disposed one above the other having a predetermined gap $H_1$ so that the liquid crystal panel 10 is divided into two parts in the Y direction.

The surface light emitters 211, 212 are not particularly limited, however, an organic EL light emitting panel which comprises three kinds of organic EL light emitting layers to emit three primary colors of R (red), G (green), and B (blue), and selectively emits the three primary colors of R, G, and B by the application of voltage, can be named as one of the surface light emitter, for example.

The concrete configuration of the organic EL light emitting panel may be as follows. That is to say, the organic EL light emitting panel may comprise, for example, a light transmissive substrate which can transmit a light, a first electrode layer which is formed on the light transmissive substrate and is transparent, three kinds of organic EL light emitting layers which are formed on the first electrode layer in a state of being divided with each other to emit three primary colors of R, G, and B, and a second electrode layer which is formed on the organic EL light emitting layers.

As shown in FIG. 2, the two surface light emitters 211, 212 are disposed so that the angle ($\theta_{all}$) between their light irradiation surfaces 211A and 212A is smaller than 180 degrees.

To put it more concretely, the two surface light emitters 211, 212 are placed so as to satisfy the conditions described in detail hereinbelow.

Figure 3:
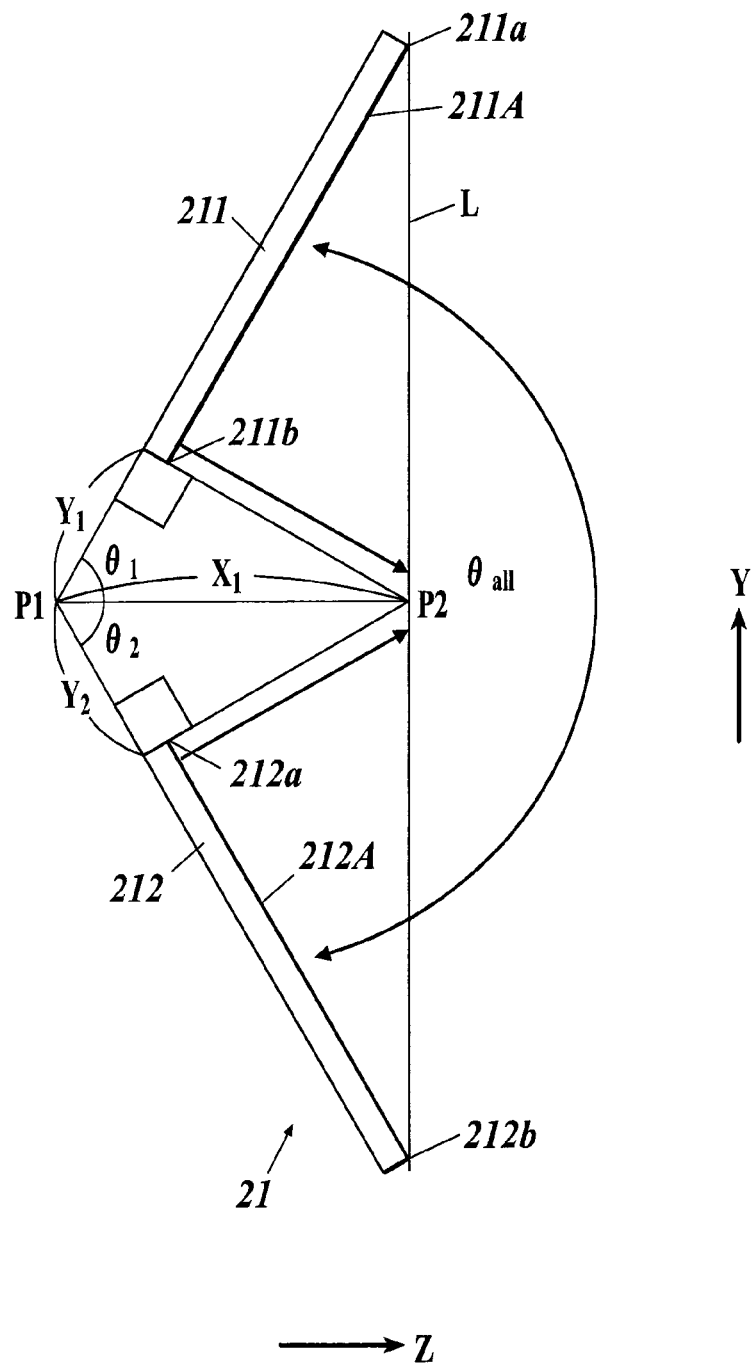
FIG. 3 is a view showing a frame format of a backlight device shown in FIG. 2 so as to describe the configuration thereof.

FIG. 3 is a diagram showing the frame format of a shape of the light emitting section 21 (surface light emitters 211, 212) which is viewed cross-sectionally.

In FIG. 3, an intersecting point formed by extending two light irradiation surfaces 211A and 212A in the gap $H_1$ direction is an intersecting point P1. Further, a crossing point formed by perpendicular lines which are respectively perpendicular to the light irradiation surfaces 211A and 212A which extend from edge sections 211b and 212a at the gap $H_1$ side of the two light irradiation surfaces 211A and 212A is a crossing point P2.

Further, a hypothetical plane surface which passes the crossing point P2 and which is parallel to the diffuser plate 22 is a hypothetical plane surface L. Moreover, the distance from the intersecting point P1 to the hypothetical plane surface L is a line segment $X_1$.

Further, distances from the edge sections 211b and 212a of the light irradiation surfaces 211A and 212A to the intersecting point 21 are respectively, a line segment $Y_1$, and a line segment $Y_2$. Moreover, the angle between the line segments $X_1$ and $Y_1$, and the angle between the line segments $X_1$ and $Y_2$ are respectively, $\theta_1$ and $\theta_2$.

In this regard, a relationship described in the following formula (1) is realized.

$$\cos(\theta_1) = Y_1/X_1$$

$$\cos(\theta_2) = Y_2/X_1 \quad (1)$$

That is to say, the formula (1) is led to the following formula (2).

$$\theta_1 = \cos^{-1}(Y_1/X_1)$$

$$\theta_2 = \cos^{-1}(Y_2/X_1) \quad (2)$$

Further, as a condition so that the lights irradiated from the two surface light emitters 211, 212 do not produce any luminance reduced parts, the following formula (3) is to be realized.

$$\theta_{all} \leq \theta_1 + \theta_2$$

which is led to $\theta_1 + \theta_2 \leq \cos^{-1}(Y_1/X_1) + \cos^{-1}(Y_2/X_1)$ \quad (3)

When the above formula (3) is satisfied, lights irradiated out from the lower edge section 211b of the light irradiation surface 211A and from the upper edge section 212a of the light irradiation surface 212A are to be crossed at P2.

The diffuser plate 22 is disposed in front of the hypothetical plane surface L at a position which is apart from the hypothetical plane surface L by a predetermined distance D.

The lights irradiated out from the surface light emitters 211, 212 of the light emitting section 21 are diffused to be approximately even while transmitting inside of the diffuser plate 22 so as to reach the liquid crystal panel 10.

The diffuser plate 22 is not particularly limited, however, a diffuser plate formed by evenly dispersing a glass fiber having a different refraction index from that of a transparent polycarbonate resin substrate to the resin substrate, or a diffuser plate formed by forming unevenness with suitable roughness on one surface of a transparent glass substrate, can be named as the diffuser plate 22.

Next, an operation of the present embodiment is described.

According to the backlight device 20 of the present embodiment, the lights irradiated to the diffuser plate 22 by the light emission of the light emitting section 21 are to satisfy the above formula (3). Thereby, the lights are to intensify each other at the shortest distance at the crossing point P2, before reaching the diffuser plate 22. That is to say, the lights irradiated from the two surface light emitters 211, 212 are to intensify each other at a position corresponding to the gap $H_1$ of the two surface light emitters 211, 212.

Here, the longer the distance of the line segment $X_1$ is, the smaller the angle ($\theta_{all}$) between the light irradiation surfaces 211A and 212A of the two surface light emitters 211, 212 becomes. Further, the shorter the distance of the line segment $X_1$ is, the larger the angle ($\theta_{all}$) between the light irradiation surfaces 211A and 212A of the two surface light emitters 211, 212 becomes.

As described above, according to the liquid crystal display apparatus 1 according to the present embodiment, the lights irradiated out from the two surface light emitters 211, 212 intensify each other at a position corresponding to the gap $H_1$ of the two surface light emitters 211, 212 before reaching the diffuser plate 22. Thereby, a dark section generated in the liquid crystal panel 10 due to the gap $H_1$ of the surface light emitters 211, 212 is vanished, and a bright section is generated, and is to be even by the diffuser plate 22. Thus, the generation of the luminance unevenness in the liquid crystal panel 10 can be reduced.

Incidentally, the diffuser plate 22 is to be disposed at a position apart from the hypothetical plane surface L by the predetermined distance D in the present embodiment. However, the back surface of the diffuser plate 22 may be overlapped with the hypothetical plane surface L.

Further, it is preferable that the hypothetical plane surface L is connected to at least one of the edge section 211a of the light irradiation surface 211A and the edge section 212b of the light irradiation surface 212A.

In a case where the above conditions are satisfied, the thickness of the backlight device 20 can be reduced to the minimum amount.

Embodiment 2

Next, an embodiment 2 of the present invention is described, the description of which is mainly given to parts different from the embodiment 1. Incidentally, the sections which are the same as those in the embodiment 1 are allotted with the same reference numbers so as to omit the description thereof.

Figure 4:
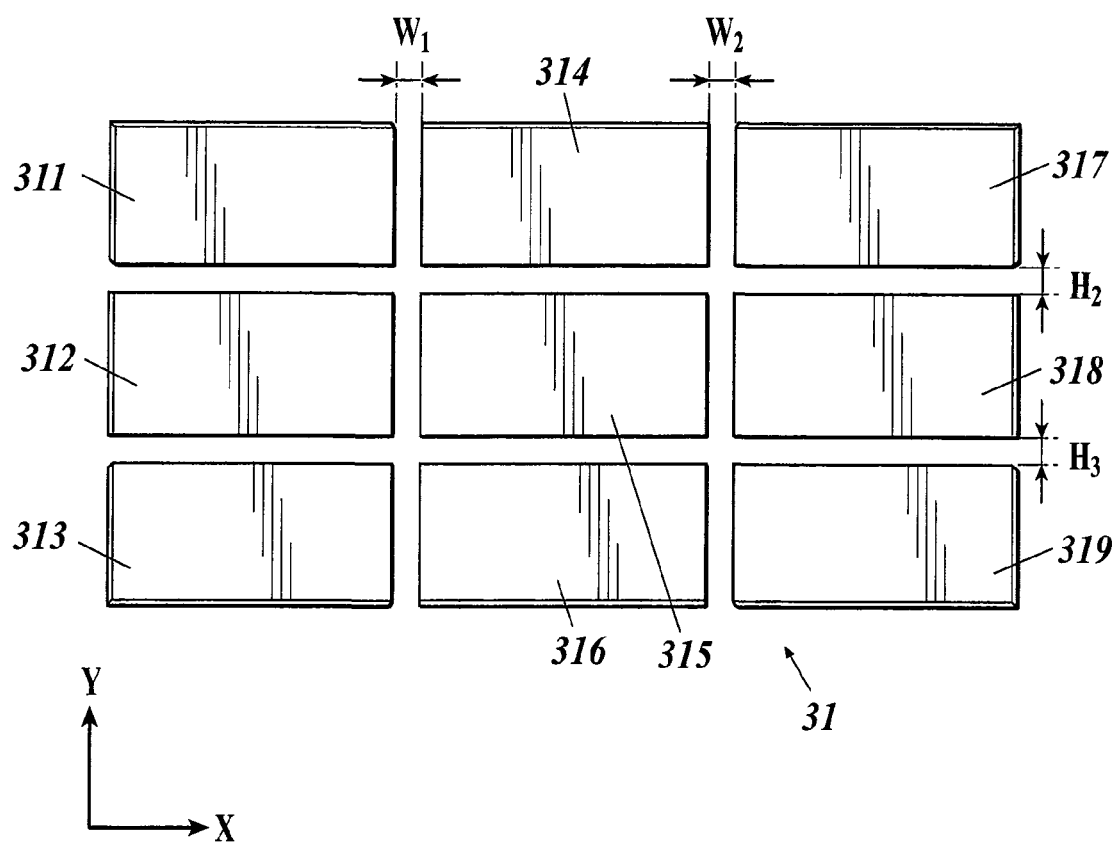
FIG. 4 is a top plan view showing a light emitting section of a backlight device comprised by a liquid crystal display apparatus of embodiment 2 according to the present invention.
Figure 5A:
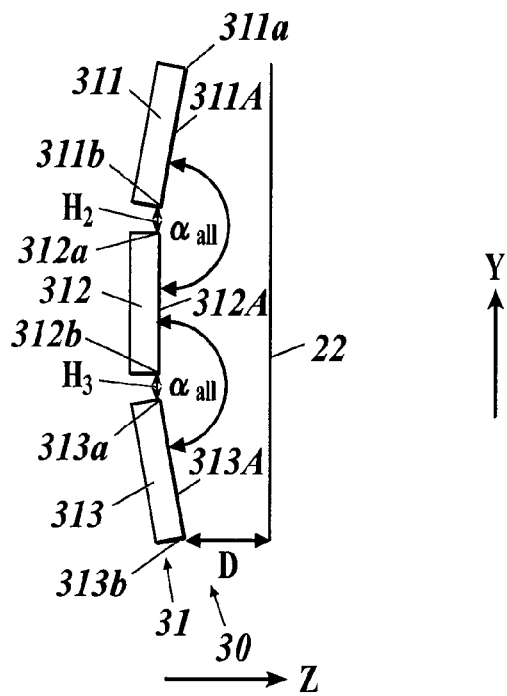
FIG. 5A is a side view of the backlight device shown in FIG. 4.
Figure 5B:
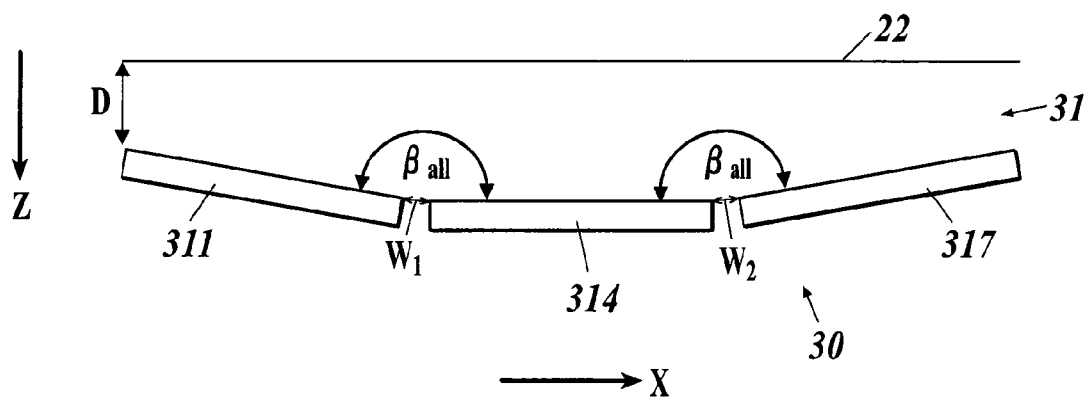
FIG. 5B is a bottom plan view of the backlight device shown in FIG. 4.

FIG. 4 is a top plan view showing a light emitting section 31 of a backlight device 30 in the embodiment 2. FIG. 5A is a side view of the backlight device 30, and FIG. 5B is a bottom plan view of the backlight device 30.

As shown in FIG. 4, the light emitting section 31 of the backlight device 30 according to the present embodiment is formed by comprising nine surface light emitters 311, 312, . . . , 319, each having a rectangular shape.

To put it more concretely, the light emitting section 31 is configured in a state where nine surface light emitters 311, . . . , are arranged and disposed so that there are three pieces each in the vertical and horizontal directions, and so that the X direction and the Y direction of the liquid crystal panel 10 are respectively divided into three parts. Here, the gaps in between the three pieces of the surface light emitters 311, . . . in the X direction are $W_1$, and $W_2$. Further, the gaps in between the three pieces of the surface light emitters 311, . . . in the Y direction are $H_2$, $H_3$.

As shown in FIG. 5A, three pieces of the surface light emitters 311, 312, and 313 arranged in the Y direction are disposed so that the light irradiation surfaces 311A, 312A, and 313A thereof respectively form the angle $\alpha_{all}$.

Further, as shown in FIG. 5B, three pieces of the surface light emitters 311, 314, and 317 arranged in the X direction are disposed so that the light irradiation surfaces 311A, 314A, and 317A thereof respectively form the angle $\beta_{all}$.

In this regard, the angles $\alpha_{all}$ and $\beta_{all}$ are angles smaller than 180 degrees.

To put it more concretely, the surface light emitters are placed so as to satisfy the conditions described in detail hereinbelow.

Figure 6:
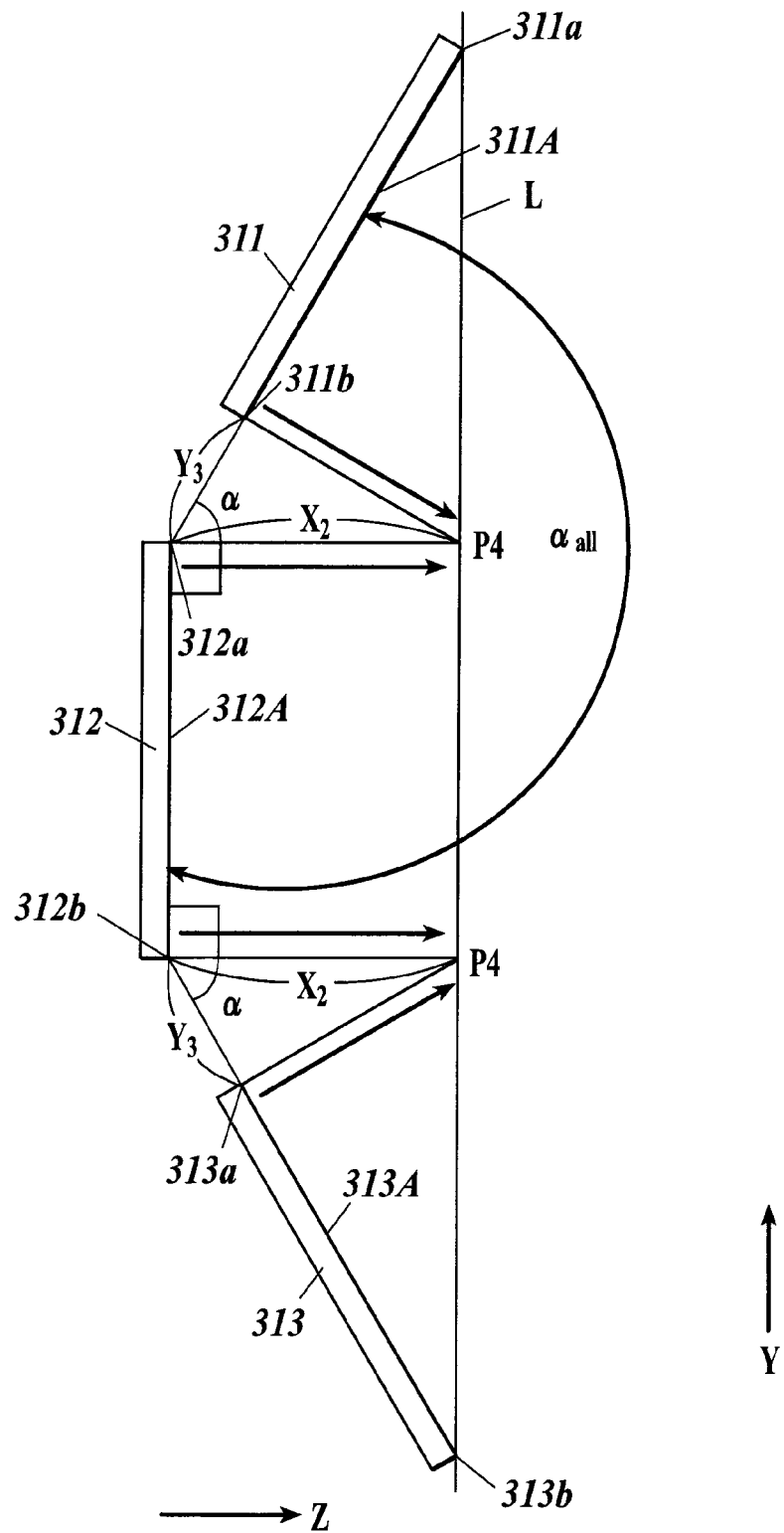
FIG. 6 is a view showing a frame format of the backlight device shown in FIGS. 5A and 5B so as to describe the configuration thereof.

FIG. 6 is a diagram showing the frame format of a shape of the three surface light emitters 311, 312, 313 arranged in the Y direction which is viewed cross-sectionally.

In FIG. 6, a crossing point formed by perpendicular lines which are respectively perpendicular to the light irradiation surfaces 311A and 312A which extend from edge sections 311b and 312a at the gap $H_2$ side of the light irradiation surfaces 311A and 312A of the upper two surface light emitters 311, 312 is a crossing point P4.

Further, a hypothetical plane surface which passes the crossing point P4 and which is parallel to the diffuser plate 22 is a hypothetical plane surface L.

Further, a distance from the hypothetical plane surface L to the edge section 312a of the lower light irradiation surface 312A is a line segment $X_2$. A distance from an edge section 311b of the light irradiation surface 311A to the edge section 312a of the light irradiation surface 312A is a line segment $Y_3$. Further, the angle between the line segments $X_2$ and $Y_3$ is $\alpha$.

In this regard, a relationship described in the following formula (4) is realized.

$$\cos(\alpha)=Y_3/X_2 \quad (4)$$

$$\alpha=\cos^{-1}(Y_3/X_2) \quad (5)$$

Further, as a condition so that the lights irradiated from the adjacent surface light emitters 311, 312 do not produce any luminance reduced parts in the liquid crystal panel 10, the following formula (6) is to be realized.

$$\alpha_{all} \leq \alpha+90 \text{ degrees}$$

which is led to $\alpha_{all} \leq \cos^{-1}(Y_3/X_2)+90$ degrees $\quad (6)$

Further, the angle formed by the light irradiation surfaces 312A, 313A of the lower two surface light emitters 312, 313 is the same as the angle $\alpha$ formed by the above described surface light emitters 311, 312.

Incidentally, the above formula (6) is a case where $\alpha=\theta_1$ and $\theta_2=90$ degrees are satisfied in the formula (3).

Further, the above formula (6) is also applicable to $\beta_{all}$.

By setting the surface light emitters in the above described manner, the lights irradiated out from the nine surface light emitters 311, . . . , intensify each other at positions corresponding to the gaps $W_1$ and $W_2$ in the X direction, and the gaps $H_2$ and $H_3$ in the Y direction of the nine surface light emitters 311, . . . , before reaching the diffuser plate 22. Thereby, a dark section generated in the liquid crystal panel 10 is vanished, and a bright section is generated, and is to be even by the diffuser plate 22. Thus, the generation of the luminance unevenness in the liquid crystal panel 10 can be reduced.

Incidentally, in the present embodiment, the conditions are set from the relationship of how the adjacent three surface light emitters are disposed. However, the conditions may be set from the relationship of how the adjacent two surface light emitters are disposed by using the formula (3) described in embodiment 1.

Further, it is preferable that the hypothetical plane surface L is connected to at least one of the edge section 311a of the light irradiation surface 311A and the edge section 313b of the light irradiation surface 313A.

In a case where the above conditions are satisfied, the thickness of the backlight device 30 can be reduced to the minimum amount.

Further, in the above embodiments 1 and 2, cases where there are two pieces and nine pieces of the surface light emitters are explained respectively as examples. However, the number of the surface light emitters is not limited to these.

Further, the case where the surface light emitter is an organic EL is used was explained, but it is not particularly limited to this, as long as the light source is of a surface state.

Moreover, the present invention can of course be suitably modified without being limited from the above described embodiments.

According to an aspect of the preferred embodiments of the present invention, there is provided a backlight device comprising:

a light emitting section including a plurality of surface light emitters which are arranged and disposed so as to have a predetermined gap; and a diffuser plate which is disposed in front of the light emitting section to diffuse a light irradiated from the light emitting section, wherein an angle between two light irradiation surfaces in the adjacent surface light emitters is smaller than 180 degrees.

Preferably, the backlight device satisfies $\theta_1+\theta_2 \leq \cos^{-1}(Y_1/X)+\cos^{-1}(Y_2/X)$, wherein a distance from a hypothetical plane surface which is parallel to the diffuser plate to an intersecting point formed by extending the two light irradiation surfaces in a gap direction is a line segment X, the hypothetical plane surface passing a crossing point formed by perpendicular lines which are respectively perpendicular to the light irradiation surfaces and which extend from edge sections at a gap side of the two light irradiation surfaces, wherein distances from the two light irradiation surfaces to the intersecting point are respectively, a line segment $Y_1$ and a line segment $Y_2$, and wherein angles formed by the line segments X and $Y_1$, and by the line segments X and $Y_2$ are respectively, $\theta_1$ and $\theta_2$.

Preferably, a liquid crystal display apparatus comprises:
the backlight device; and
a liquid crystal panel disposed in a light irradiation surface side of the light emitting section of the backlight device.

According to the preferred embodiments of the present invention, an angle between the light irradiation surfaces of the two adjacent surface light emitters is configured to be smaller than 180 degrees, thereby lights irradiated out from the light irradiation surfaces of the two adjacent surface light emitters intensify each other. Thus, a dark section generated in the gap of the adjacent surface light emitters is vanished, and a bright section is generated, and is to be even by the diffuser plate. Therefore, the luminance unevenness in the liquid crystal panel can be prevented.

The entire disclosure of Japanese Patent Application No. 2008-122874 filed on May 9, 2008 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

The invention claimed is:

1. A backlight device comprising:
a light emitting section including a plurality of surface light emitters which are arranged and disposed so as to have a predetermined gap between adjacent surface light emitters; and
a diffuser plate which is disposed in front of the light emitting section to diffuse light irradiated from the light emitting section, wherein:
each of the surface light emitters comprises a single light irradiation surface that lies substantially in a single respective plane,
each of the surface light emitters generates light and emits the light in a direction perpendicular to its light irradiation surface from substantially the entire light irradiation surface,
an angle between respective light irradiation surfaces of the adjacent surface light emitters is smaller than 180 degrees, and
the angle between the respective light irradiation surfaces is set so that a crossing point formed by lines, which are perpendicular to the respective light irradiation surfaces and which extend from respective first edge sections of the respective light irradiation surfaces adjacent to the gap, is positioned on a hypothetical plane surface, which is a plane connecting respective second edge sections of the respective light irradiation surfaces, wherein the first edge sections and the second edge sections are formed at opposite ends of the respective light irradiation surfaces.

2. The backlight device according to claim 1, which satisfies $\theta_1+\theta_2 \leq \cos^{-1}(Y_1/X)+\cos^{-1}(Y_2/X)$, wherein
a distance from the hypothetical plane surface, which is parallel to the diffuser plate, to an intersecting point formed by extending the respective light irradiation surfaces in a gap direction is a line segment X, wherein
distances from the respective light irradiation surfaces to the intersecting point are respectively, a line segment $Y_1$ and a line segment $Y_2$, and wherein
angles formed by the line segments X and $Y_1$, and by the line segments X and $Y_2$ are respectively, $\theta_1$ and $\theta_2$.

3. A liquid crystal display apparatus comprising:
the backlight device according to claim 2; and
a liquid crystal panel disposed in a light irradiation surface side of the light emitting section of the backlight device.

4. The backlight device according to claim 2, wherein the hypothetical plane surface is in contact with at least one edge section at an upper side or a lower side of the light irradiation surfaces of the adjacent surface light emitters.

5. A liquid crystal display apparatus comprising:
the backlight device according to claim 1; and
a liquid crystal panel disposed in a light irradiation surface side of the light emitting section of the backlight device.

6. The backlight device according to claim 1, wherein the light emitting section comprises:
a first light emitting section including at least three surface light emitters which are arranged in a vertical direction, and which are arranged and disposed so as to have a respective predetermined gap between each pair of adjacent surface light emitters in the vertical direction; and
a second light emitting section including at least three surface light emitters which are arranged in a horizontal direction, and which are arranged and disposed so as to have a respective predetermined gap between each pair of adjacent surface light emitters in the horizontal direction, wherein:
each of the surface light emitters has a substantially rectangular shape, and
the vertical direction is substantially perpendicular to the horizontal direction.

7. The backlight device according to claim 6, wherein each respective angle between light irradiation surfaces of each pair of adjacent surface light emitters is smaller than 180 degrees.

8. The backlight device according to claim 1, wherein each surface light emitter is an organic electroluminescence (EL) panel.

9. The backlight device according to claim 1, wherein:
the diffuser plate is disposed at a position apart from the hypothetical plane surface by a predetermined distance in a direction separating the diffuser plate from the surface light emitters, and
the hypothetical plane surface is parallel to the diffuser plate.

10. The backlight device according to claim 9, wherein the predetermined distance is 0.

* * * * *